United States Patent
Murakami

(10) Patent No.: US 8,584,818 B2
(45) Date of Patent: Nov. 19, 2013

(54) SHOCK ABSORBER

(75) Inventor: Hiroshi Murakami, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 109 days.

(21) Appl. No.: 13/215,482

(22) Filed: Aug. 23, 2011

(65) Prior Publication Data

US 2012/0048666 A1    Mar. 1, 2012

(30) Foreign Application Priority Data

Aug. 31, 2010    (JP) ................................ 2010-194903

(51) Int. Cl.
*F16F 9/34*    (2006.01)
(52) U.S. Cl.
USPC ................................ 188/322.15; 188/322.13
(58) Field of Classification Search
USPC ........ 188/275, 280, 281, 281.1, 282.5, 282.6, 188/297, 322.13, 322.15, 322.2
See application file for complete search history.

(56) References Cited

U.S. PATENT DOCUMENTS

| 6,474,454 B2 * | 11/2002 | Matsumoto et al. ....... 188/282.6 |
| 2005/0263363 A1 | 12/2005 | Katou et al. |
| 2011/0209956 A1 * | 9/2011 | Maeda ..................... 188/322.13 |

FOREIGN PATENT DOCUMENTS

| JP | 2006-10069 | | 1/2006 |
| JP | 2006038097 A | * | 2/2006 |

* cited by examiner

*Primary Examiner* — Anna Momper
(74) *Attorney, Agent, or Firm* — Wenderoth, Lind & Ponack, L.L.P.

(57)    ABSTRACT

A piston connected to a piston rod is fitted in a cylinder having a hydraulic oil sealed therein. Flows of hydraulic oil induced by sliding movement of the piston are controlled by extension and compression damping force generating mechanisms and to generate damping force. In the extension damping force generating mechanism, the valve-opening pressure of a disk valve is controlled by the pressure in a back pressure chamber. An elastic seal member fixed to the disk valve is brought into sliding contact with an inner peripheral surface of a cylindrical portion of a valve member to seal the back pressure chamber. The disk valve is self-aligned by fitting between the elastic seal member and the inner peripheral surface of the valve member and secured by being axially clamped at an inner peripheral portion thereof in a state where a clearance is formed between the inner peripheral portion of the disk valve and a shaft portion of the piston rod, thereby reducing the requirements for coaxiality.

11 Claims, 4 Drawing Sheets

SHOCK ABSORBER

BACKGROUND OF THE INVENTION

The present invention relates to shock absorbers generating a damping force by utilizing the fluid pressure.

Shock absorbers attached to suspension systems of automobiles or other vehicles generally have the following structure. A piston connected to a piston rod is slidably fitted in a cylinder having a fluid sealed therein. A stroke of the piston rod causes sliding movement of the piston in the cylinder, which, in turn, induces a flow of fluid. The fluid flow is controlled by a damping force control mechanism comprising an orifice, a disk valve, etc., thereby generating a damping force.

A hydraulic shock absorber disclosed in Japanese Patent Application Publication No. 2006-10069, for example, has a back pressure chamber (pilot chamber) formed at the back of a main disk valve constituting a damping force generating mechanism. A part of the fluid flow is introduced into the back pressure chamber, and the pressure in the back pressure chamber is applied to the main disk valve in the direction for closing the valve. The pressure in the back pressure chamber is adjusted by a pilot valve, thereby controlling the valve opening of the main disk valve. This technique makes it possible to increase the degree of freedom for adjusting damping force characteristics.

In the hydraulic shock absorber disclosed in Japanese Patent Application Publication No. 2006-10069, an annular oil seal (elastic seal member) is fixed to the rear surface of the main disk valve. The oil seal is slidably and gas-tightly fitted into a circular cylindrical portion of a valve member in the shape of a circular cylinder, one end of which is closed, thereby forming a back pressure chamber. This structure needs to increase slidability and sealability between the cylindrical portion of the valve member and the oil seal in order to allow the main disk valve to open and close smoothly and to thereby obtain stable damping force characteristics. In this regard, if such a structure is adopted that an inner peripheral portion of the main disk valve is secured by being axially clamped (see FIGS. 4 and 10 in Japanese Patent Application Publication No. 2006-10069), it is necessary to increase the coaxiality between the oil seal, the main disk valve and the valve member in order to increase the slidability and sealability between the cylindrical portion of the valve member and the oil seal.

SUMMARY OF THE INVENTION

It is, however, necessary in order to increase the coaxiality between the three members, i.e. the oil seal, the main disk valve and the valve member, to control the dimensions of each member with high accuracy, which causes a reduction in productivity and an increase in manufacturing cost. To obtain stable damping force characteristics during the generation of a low damping force, in particular, the sliding resistance needs to be reduced as much as possible, and it is necessary to ensure sealability while reducing the interference between the oil seal and the cylindrical portion of the valve member. Therefore, high dimensional accuracy and high coaxiality are required.

An object of the present invention is to provide a shock absorber configured to increase the slidability and sealability of an elastic seal member provided on the rear surface of a disk valve to form a back pressure chamber while reducing the coaxiality requirements for each part of a damping force generating mechanism.

To solve the above-described problem, the present invention provides a shock absorber including a cylinder having a hydraulic fluid sealed therein, a piston slidably fitted in the cylinder, a piston rod connected to the piston and extending to the outside of the cylinder, and a damping force generating mechanism generating a damping force by controlling the flow of the hydraulic fluid induced by sliding movement of the piston. The damping force generating mechanism has an annular disk valve, an annular elastic seal member integrally provided on the rear surface of the disk valve, a cylindrical casing member having a bottom and having an inner peripheral surface to which the elastic seal member is slidably fitted to form a back pressure chamber at the rear side of the disk valve, and a shaft portion having a circular outer periphery, which is disposed in the mutual center of the disk valve and the bottom of the casing member. The disk valve is secured to the casing member by being axially clamped at an inner peripheral portion thereof. A clearance is formed between the inner peripheral portion of the disk valve and the outer periphery of the shaft portion over substantially the entire circumference of the shaft portion.

DETAILED DESCRIPTION OF THE INVENTION

Embodiments of the present invention will be explained below in detail with reference to the accompanying drawings.

Figure 1:
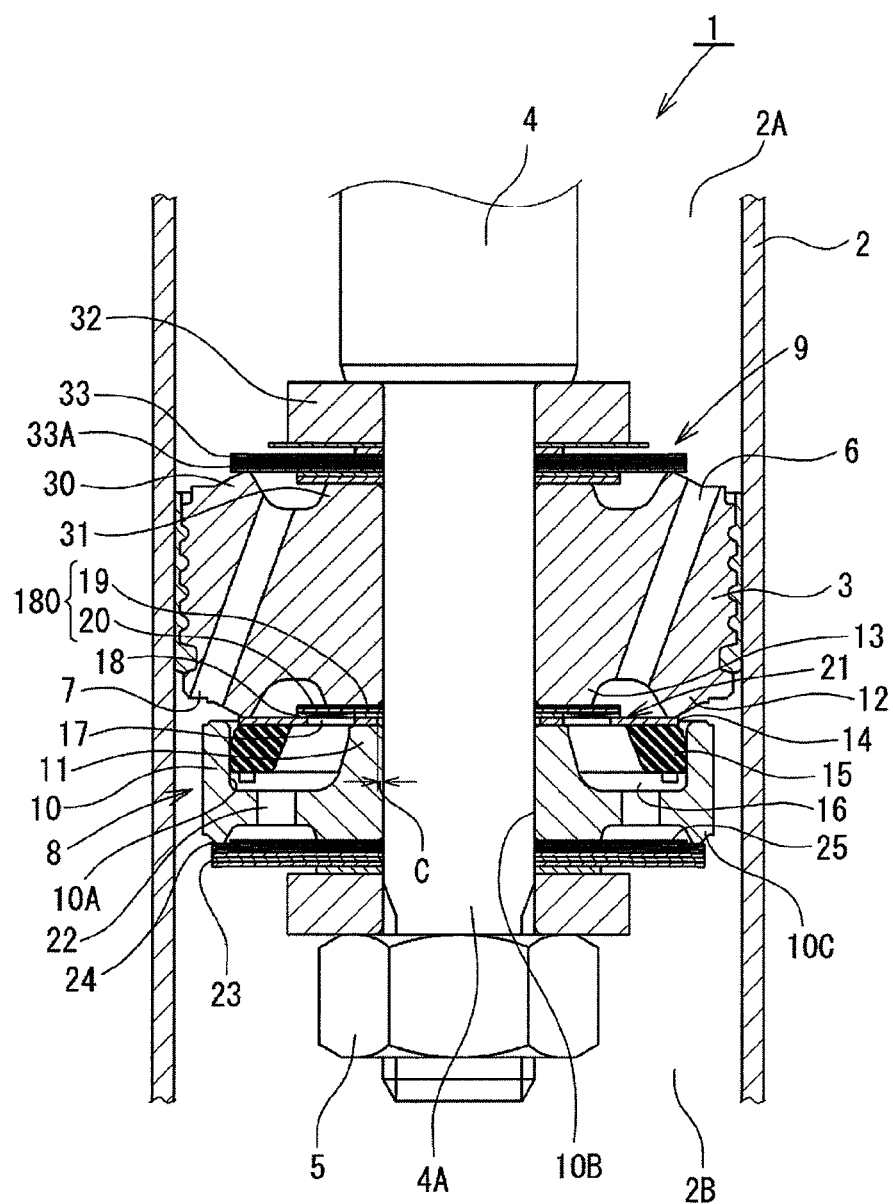
FIG. 1 is an enlarged vertical sectional view showing a piston part of a shock absorber according to a first embodiment of the present invention.
Figure 4:
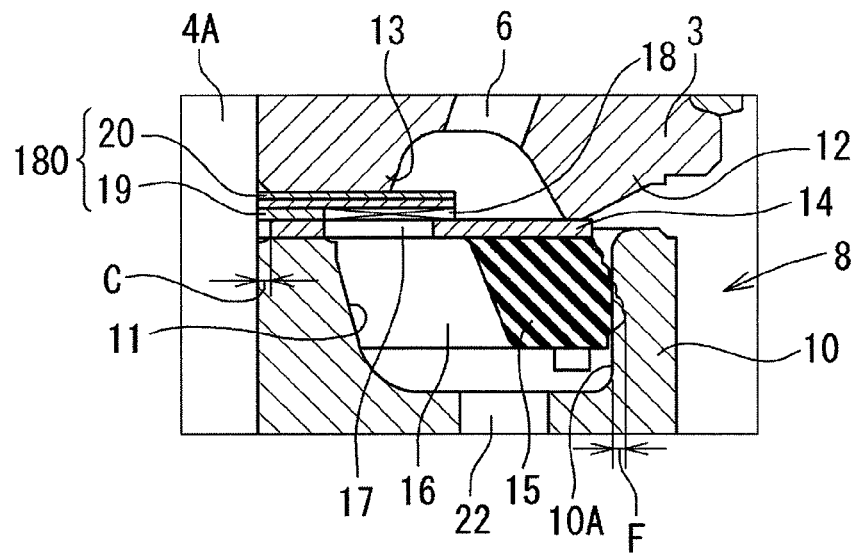
FIG. 4 is an enlarged vertical sectional view of a disk valve of the shock absorber shown in FIG. 1.

A first embodiment of the present invention will be explained with reference to FIGS. 1 and 4. As shown in FIG. 1, a shock absorber 1 according to this embodiment is a single-tube hydraulic shock absorber attached to a suspension system of an automobile or other vehicle. A piston 3 is slidably fitted in a cylinder 2 (only a part of a side wall thereof is shown) having a hydraulic oil sealed therein as a hydraulic fluid. The piston 3 divides the interior of the cylinder 2 into two chambers, i.e. a cylinder upper chamber 2A and a cylinder lower chamber 2B. The piston 3 is connected to a shaft portion 4A at one end of a piston rod 4 by a nut 5. The other end of the piston rod 4 extends to the outside of the cylinder 2 through a rod guide (not shown) and an oil seal (not shown) that are fitted to the upper end of the cylinder 2. The cylinder lower chamber 2B is connected to a reservoir (not shown) through a base valve (not shown) having a proper flow resistance. The reservoir has the hydraulic oil and a gas sealed therein.

The piston 3 is provided with an extension passage 6 and a compression passage 7 for communication between the cylinder upper and lower chambers 2A and 2B. An extension damping force generating mechanism 8 is provided at an end of the piston 3 closer to the cylinder lower chamber 2B to generate a damping force by controlling the flow of hydraulic oil through the extension passage 6. A compression damping force generating mechanism 9 is provided at an end of the piston 3 closer to the cylinder upper chamber 2A to generate a damping force by controlling the flow of hydraulic oil through the compression passage 7.

The extension damping force generating mechanism 8 will be explained with reference to FIG. 4.

The extension damping force generating mechanism 8 has a valve member 10 as a casing member in the shape of a cylinder, one end of which is closed. The valve member 10 is attached to an end of the piston 3 that is closer to the cylinder lower chamber 2B. The valve member 10 is formed with an insertion hole 10B. The insertion hole 10B extends through a circular cylindrical retaining portion 11 standing in the center of the inner side of the valve member 10. The piston rod 4 has at the proximal end thereof a small-diameter shaft portion 4A having a circular outer periphery. The insertion hole 10B receives the small-diameter shaft portion 4A therethrough. The valve member 10 is secured to the piston 3 by screwing a nut 5 onto the small-diameter shaft portion 4A.

The piston 3 has an annular seat portion 12 projecting from an outer peripheral position on an end surface thereof closer to the cylinder lower chamber 2B. The piston 3 further has an annular clamp portion 13 projecting from an inner peripheral position on the cylinder lower chamber-side end surface thereof. An annular space is formed between the seat portion 12 and the clamp portion 13. The extension passage 6 opens into the annular space.

An inner peripheral portion of an annular flexible disk valve 14 is clamped between the retaining portion 11 and the clamp portion 13. An outer peripheral portion of the disk valve 14 seats on the seat portion 12. The disk valve 14 has an annular elastic seal member 15 integrally provided on an outer peripheral portion of the rear surface of the disk valve 14, thus forming a seal-equipped disk valve. An outer peripheral portion of the elastic seal member 15 slidably and fluid-tightly abuts against the inner peripheral surface 10A of the cylindrical portion of the valve member 10 to form a back pressure chamber 16 inside the valve member 10.

The disk valve 14 has openings 17 provided in the inner peripheral portion thereof. A cut disk member 19 and a disk member 20 are stacked on an end of the disk valve 14 closer to the clamp portion 13. The cut disk member 19 has a plurality of cut portions 18 (orifices) at positions facing the openings 17. The openings 17 and the cut portions 18 form a back pressure chamber entrance passage 21 constantly communicating between the extension passage 6 and the back pressure chamber 16. When the disk valve 14 deflects to lift from the seat portion 12, the disk valve 14 also lifts from the cut disk member 19 simultaneously. Consequently, the flow path area of the back pressure chamber entrance passage 21 increases. The cut disk member 19 and the disk member 20 are secured by being axially clamped between the clamp portion 13 of the piston 3 and the distal end of the retaining portion 11 of the valve member 10, together with the disk valve 14. Hereinafter, the cut disk member 19 and the disk member 20 in combination will be referred to as "washer 180".

The elastic seal member 15 is made of an elastic material, e.g. rubber, and fixed to the disk valve 14 by vulcanization bonding or the like. The outer periphery of the elastic seal member 15 is tapered such that the diameter thereof increases with the distance from the disk valve 14, to which the seal member 15 is fixed. The outer periphery of the elastic seal member 15 is in sliding contact with the inner peripheral surface 10A of the cylindrical portion of the valve member 10. The outer periphery of the elastic seal member 15 is formed with a plurality of concentrically disposed steps to seal the area of sliding contact with the inner peripheral surface 10A in a multi-step sealing manner. The outer diameter of the elastic seal member 15 is larger than the diameter of the inner peripheral surface 10A. Thus, an interference F is formed between the elastic seal member 15 and the inner peripheral surface 10A. The inner diameter of the disk valve 14 is sufficiently larger than the outer diameter of the shaft portion 4A disposed in the mutual center of the disk valve 14 and the valve member 10 and also sufficiently larger than the diameter of the insertion hole 10B of the valve member 10. Thus, a clearance C is formed between the shaft portion 4A and the disk valve 14 over the entire circumference of the shaft portion 4A. That is, the positioning of the disk valve 14 in the radial direction is performed by fitting between the outer periphery of the elastic seal member 15 and the inner peripheral surface 10A of the valve member 10, which are fitted to each other with the interference F. Any misalignment between the respective centers of the inner periphery of the disk valve 14 and the inner periphery of the valve member 10 is accommodated by the clearance C. The disk valve 14 is positioned in the radial direction in this way, and in this state, the inner peripheral portion of the disk valve 14 is axially clamped and secured by tightening the nut 5 serving as a securing member.

In the foregoing explanation, the clearance C is formed between the inner periphery of the disk valve 14 and the outer periphery of the shaft portion 4A over the entire circumference of the shaft portion 4A. In actual practice, however, there may be a case (individual) where an area with no clearance (i.e. an area with a clearance of zero) occurs locally in the circumferential direction due to the disk valve 14 being slightly displaced in the radial direction in the course of tightening the nut 5 or due to dimensional tolerances, etc. However, the slidability and sealability of the elastic seal member 15 can be improved as compared to the conventional technique, provided that the clearance C is formed over substantially the entire circumference of the shaft portion 4A according to the design concept.

The minimum value Dmin of the inner diameter of the disk valve 14 may be obtained by the following equation:

$$D\min = d\max + (Z1 + Z2)$$

where:

dmax: the maximum diameter of the shaft portion 4A of the piston rod 4;

Z1: the coaxiality between the inner periphery of the disk valve 14 and the outer periphery of the elastic seal member 15;

Z2: the coaxiality between the inner peripheral surface 10A of the valve member 10 and the inner peripheral surface 10B for fitting with the shaft portion 4A of the piston rod 4.

The clearance between the insertion hole 10B of the valve member 10 and the shaft portion 4A of the piston rod 4 is ignored because it is small.

The bottom of the valve member 10 is provided with a passage 22 for communication between the back pressure chamber 16 and the cylinder lower chamber 2B. The passage 22 is provided with a relief valve 23 that is a normally-closed disk valve adapted to relieve the hydraulic oil in the back pressure chamber 16 into the cylinder lower chamber 2B when the pressure in the back pressure chamber 16 reaches a predetermined pressure. The relief valve 23 is provided with a downstream orifice 24 (cut portion) constantly communicating between the back pressure chamber 16 and the cylinder lower chamber 2B. The relief valve 23 is further provided with a check valve 25 allowing only the flow of hydraulic oil from the cylinder lower chamber 2B toward the back pressure chamber 16. Although the downstream orifice 24 is formed by providing a cut portion in a disk valve that constitutes the relief valve 23 and that abuts against a seat portion 10C of the valve member 10, the downstream orifice 24 may also be formed by coining the seat portion 10C of the valve member 10.

Next, the compression damping force generating mechanism 9 will be explained.

The compression damping force generating mechanism 9 has a compression passage 7 and a disk valve 33. The compression passage 7 opens into an annular space formed between a seat portion 30 annularly projecting from an outer peripheral position of an end surface of the piston 3 closer to the cylinder upper chamber 2A and a clamp portion 31 annularly projecting from an inner peripheral position of the cylinder upper chamber-side end surface of the piston 3.

The disk valve 33 has an outer peripheral portion. The outer peripheral portion of the disk valve 33 seats on the seat portion 30. The disk valve 33 is clamped at an inner peripheral portion thereof between the clamp portion 31 and a step portion formed at the proximal end of the shaft portion 4A with an annular retainer 32 interposed between the disk valve 33 and the step portion.

The disk valve 33 comprises a plurality of stacked circular plate-shaped disks. The disk valve 33 deflects to lift from the seat portion 30 upon receiving the pressure in the cylinder lower chamber 2B through the compression passage 7. Thus, the disk valve 33 opens and adjusts the flow path area of the compression passage 7 according to the degree of opening thereof. The disk valve 33 is provided with an orifice 33A (cut portion) constantly communicating between the cylinder upper and lower chambers 2A and 2B. The orifice 33A comprises a cut portion formed in the disk valve 33. The orifice 33A may be replaced by a communicating passage constantly communicating between the cylinder upper and lower chambers 2A and 2B, which may be formed by coining the seat portion 30.

The following is an explanation of the operation of this embodiment arranged as stated above.

During the extension stroke of the piston rod 4, the sliding movement of the piston 3 in the cylinder 2 causes the hydraulic oil in the cylinder upper chamber 2A to flow toward the cylinder lower chamber 2B through the extension passage 6 in the piston 3, and a damping force is generated by the extension damping force generating mechanism 8. At this time, an amount of hydraulic oil corresponding to the amount by which the piston rod 4 exits from the cylinder 2 flows into the cylinder lower chamber 2B from the reservoir through the base valve, and the gas in the reservoir expands correspondingly, thereby compensating for a volumetric change of the hydraulic oil in the cylinder 2.

In the extension damping force generating mechanism 8, when the piston speed is in a very low speed region (i.e. in the initial stroke region of the piston rod 4), the back pressure chamber entrance passage 21 and the downstream orifice 24 generate a damping force of orifice characteristics. When the piston speed increases, the disk valve 14 opens to generate a damping force of valve characteristics. At the same time as the disk valve 14 opens, the flow path area of the back pressure chamber entrance passage 21 increases, and the pressure in the back pressure chamber 16 increases. Thus, as the piston speed increases, the valve-opening pressure of the disk valve 14 increases, and the damping force increases. When the pressure in the back pressure chamber 16 reaches a predetermined pressure, the relief valve 23 opens to relieve the pressure in the back pressure chamber 16 into the cylinder lower chamber 2B, thereby preventing an excessive increase of the valve-opening pressure of the disk valve 14, i.e. preventing an excessive increase of the extension damping force.

During the compression stroke of the piston rod 4, the sliding movement of the piston 3 in the cylinder 2 causes the hydraulic oil in the cylinder lower chamber 2B to flow toward the cylinder upper chamber 2A through the compression passage 7 in the piston 3, and a damping force is generated by the compression damping force generating mechanism 9. At this time, an amount of hydraulic oil corresponding to the amount by which the piston rod 4 enters the cylinder 2 flows into the reservoir through the base valve and compresses the gas in the reservoir, thereby compensating for a volumetric change of the hydraulic oil in the cylinder 2.

In the compression damping force generating mechanism 9, when the piston speed is in a low speed region (before the disk valve 33 opens), the orifice 33A generates a damping force of orifice characteristics. When the piston speed increases to reach the valve-opening pressure of the disk valve 33, the disk valve 33 opens to generate a damping force of valve characteristics according to the degree of opening of the disk valve 33.

During the compression stroke, in the extension damping force generating mechanism 8, the check valve 25 opens to introduce the pressure in the cylinder lower chamber 2B into the back pressure chamber 16. Consequently, the pressure in the back pressure chamber 16 acting on the disk valve 14 in the direction for closing the disk valve 14 becomes larger than the pressure in the cylinder lower chamber 2B acting on the disk valve 14 in the direction for opening the disk valve 14. Thus, the extension disk valve 14 can be surely kept closed, and a stable damping force can be obtained.

In the extension damping force generating mechanism 8, the outer diameter of the elastic seal member 15 is larger than the inner diameter of the inner peripheral surface 10A of the cylindrical portion of the valve member 10 to form an interference F between the elastic seal member 15 and the cylindrical portion of the valve member 10. In addition, the inner diameter of the disk valve 14 is sufficiently larger than the outer diameter of the shaft portion 4A of the piston rod 4 to form a clearance C between the disk valve 14 and the shaft portion 4A. Therefore, the disk valve 14 is self-aligned by fitting between the outer periphery of the elastic seal member 15 and the inner peripheral surface 10A of the cylindrical portion of the valve member 10. In this position, the disk valve 14 is axially clamped and secured by tightening the nut 5. Accordingly, any misalignment between the respective centers of the outer periphery of the elastic seal member 15, the inner periphery of the disk valve 14, the inner peripheral surface 10A of the cylindrical portion of the valve member 10 and the inner periphery of the retaining portion 11 can be allowed by the clearance C. It is therefore possible to ensure slidability and sealability between the elastic seal member 15 of the disk valve 14 and the inner peripheral surface 10A of the cylindrical portion of the valve member 10 and hence possible to obtain stable damping force characteristics. In addition, because the requirements for dimensional tolerances and coaxiality are reduced, it is possible to increase productivity and to reduce manufacturing cost.

Accordingly, when the disk valve 14 is assembled to the shaft portion 4A, the inner peripheral surface 10A of the valve member 10 and the elastic seal member 15 form concentric circles, respectively. Further, in this embodiment, the elastic seal member 15 is fixed to the disk valve 14 by vulcanization bonding. In this regard, it is difficult to perform processing for obtaining coaxiality of the elastic seal member 15 with respect to the disk valve 14. However, any coaxiality error can be allowed by the clearance C. Therefore, it is possible to reduce the processing time for vulcanization bonding.

Further, in this embodiment, the clearance C formed between the inner periphery of the disk valve 14 and the outer periphery of the shaft portion 4A of the piston rod 4 is larger than the clearance between the outer periphery of the shaft portion 4A and the inner periphery of the washer 180, which comprises the cut disk member 19 and the disk member 20 stacked on the disk valve 14, when these constituent members are assembled together by the nut 5 serving as a securing member. With this structure, the washer 180 is positioned by being restricted at the inner periphery thereof by the inner periphery of the washer 180 and the outer periphery of the shaft portion 4A. On the other hand, the disk valve 14 is positioned by being restricted at the outer periphery thereof by the outer periphery of the elastic seal member 15 and the inner peripheral surface 10A of the cylindrical portion of the valve member 10.

Although in the foregoing first embodiment only the extension damping force generating mechanism 8 is a back pressure type (pilot type) damping force generating mechanism having the back pressure chamber 16, the compression damping force generating mechanism 9 may be a back pressure type (pilot type) damping force generating mechanism having a back pressure chamber similar to that of the extension damping force generating mechanism 8.

Figure 5:
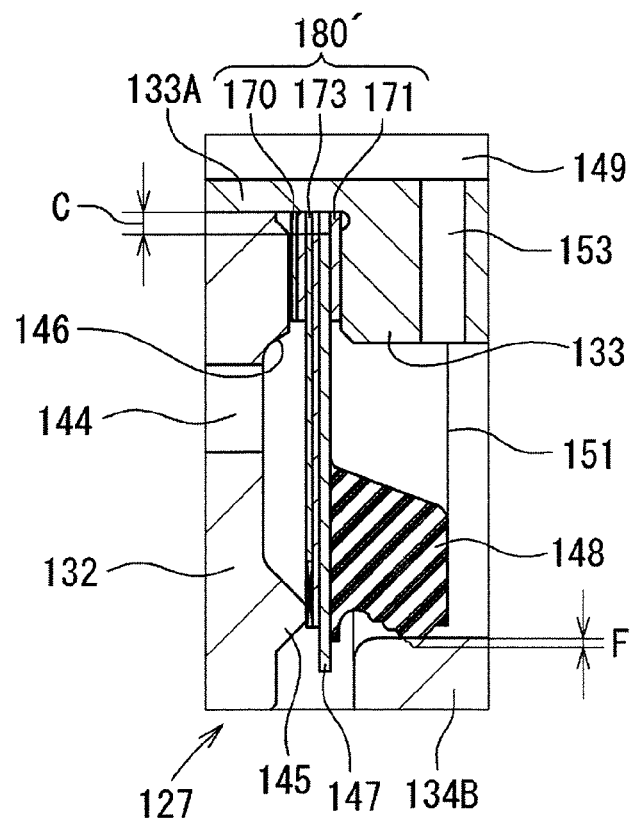
FIG. 5 is an enlarged vertical sectional view of a disk valve of the damping force generating mechanism shown in FIG. 3.

Next, a second embodiment of the present invention will be explained with reference to FIGS. 2, 3 and 5.

Figure 2:
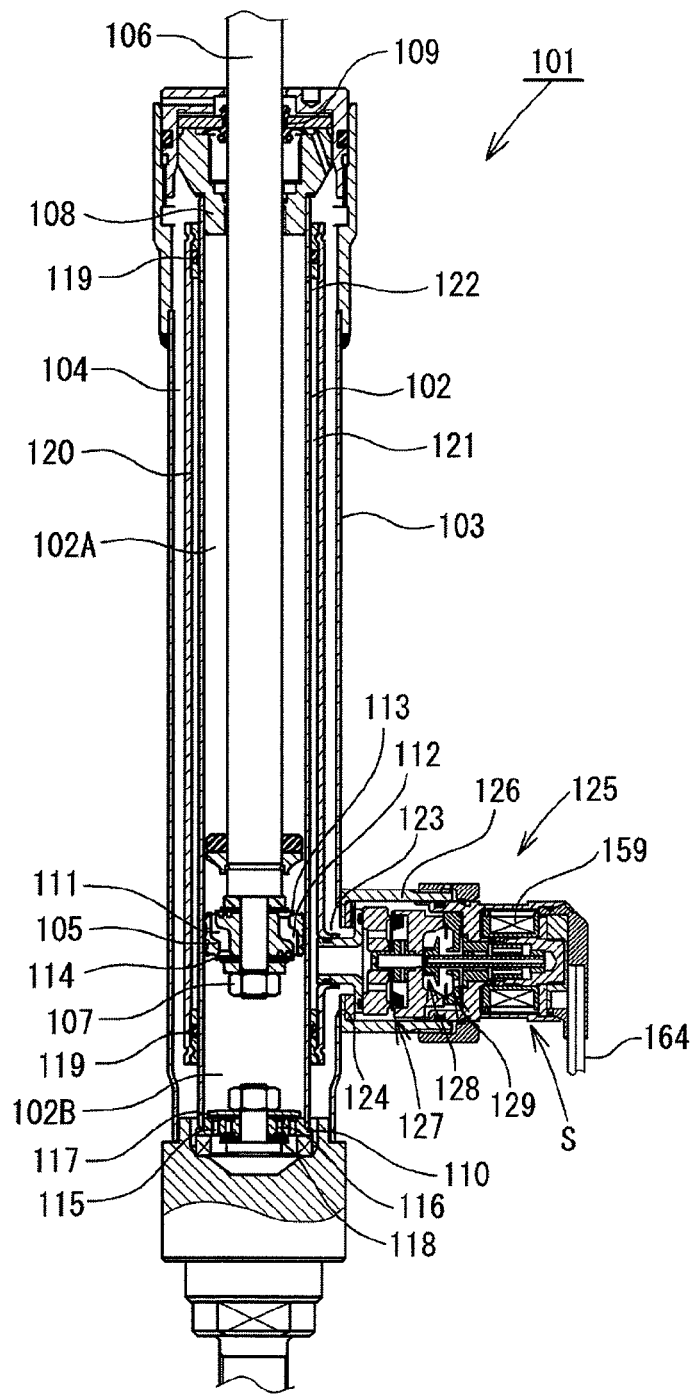
FIG. 2 is a vertical sectional view of a shock absorber according to a second embodiment of the present invention.

As shown in FIG. 2, a shock absorber 101 according to this embodiment has a dual-tube structure comprising a cylinder 102 and an outer tube 103 provided outside the cylinder 102. A reservoir 104 is formed between the cylinder 102 and the outer tube 103. A piston 105 is slidably fitted in the cylinder 102. The piston 105 divides the interior of the cylinder 102 into two chambers, i.e. a cylinder upper chamber 102A and a cylinder lower chamber 102B. The piston 105 is connected to one end of a piston rod 106 by a nut 107. The other end portion of the piston rod 106 extends through the cylinder upper chamber 102A and further through a rod guide 108 and an oil seal 109, which are fitted to the upper end portion of the double-tube structure comprising the cylinder 102 and the outer tube 103, and projects to the outside of the cylinder 102. A base valve 110 is provided in the lower end portion of the cylinder 102 to divide the cylinder lower chamber 102B and the reservoir 104 from each other.

The piston 105 is provided with passages 111 and 112 for communication between the cylinder upper and lower chambers 102A and 102B. The passage 112 is provided with a check valve 113 allowing only the flow of fluid from the cylinder lower chamber 102B toward the cylinder upper chamber 102A. The passage 111 is provided with a disk valve 114 that opens when the pressure of fluid in the cylinder upper chamber 102A reaches a predetermined pressure to relieve the fluid pressure into the cylinder lower chamber 102B.

The base valve 110 is provided with passages 115 and 116 for communication between the cylinder lower chamber 102B and the reservoir 104. The passage 115 is provided with a check valve 117 allowing only the flow of fluid from the reservoir 104 toward the cylinder lower chamber 102B. The passage 116 is provided with a disk valve 118 that opens when the pressure of fluid in the cylinder lower chamber 102B reaches a predetermined pressure to relieve the fluid pressure into the reservoir 104. A hydraulic oil is sealed in the cylinder 102 as a hydraulic fluid, and the hydraulic oil and a gas are sealed in the reservoir 104.

The cylinder 102 has a separator tube 120 fitted thereover with seal members 119 interposed therebetween at the upper and lower ends of the cylinder 102. An annular passage 121 is formed between the cylinder 102 and the separator tube 120. The annular passage 121 is communicated with the cylinder upper chamber 102A through a passage 122 provided in a side wall of the cylinder 102 near the upper end thereof. The separator tube 120 has a small-diameter opening portion 123 projecting from a lower part of the side wall thereof. The side wall of the outer tube 103 is provided with a large-diameter opening 124 in substantially concentric relation to the opening portion 123. A damping force generating mechanism 125 is attached to the opening 124 in the side wall of the outer tube 103.

Next, the damping force generating mechanism 125 will be explained with reference mainly to FIG. 3.

Figure 3:
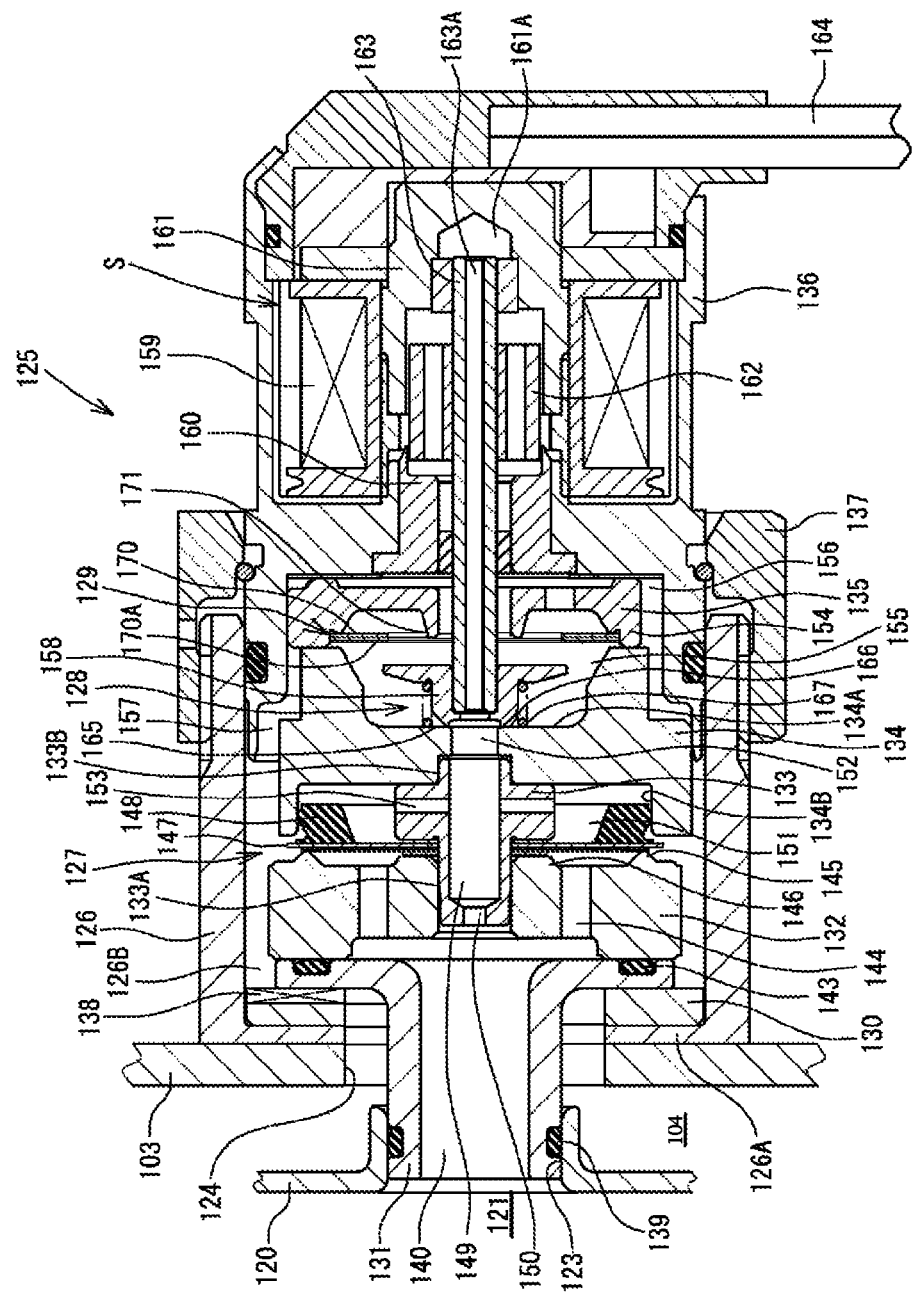
FIG. 3 is an enlarged vertical sectional view of a damping force generating mechanism of the shock absorber shown in FIG. 2.

As shown in FIG. 3, the damping force generating mechanism 125 has a circular cylindrical casing 126 attached to the opening 124 of the outer tube 103. The casing 126 is provided therein with a pilot type (back pressure type) main valve 127 and a pilot valve 128, which is a solenoid-driven pressure control valve controlling the valve-opening pressure of the main valve 127. The damping force generating mechanism 125 further has a fail-safe valve 129 provided downstream of the pilot valve 128. The fail-safe valve 129 operates when there is a failure.

The casing 126 contains, in order from the opening 124 side thereof, an annular passage plate 130, a flanged cylinder-shaped passage member 131, an annular main valve member 132, a flanged cylinder-shaped orifice passage member 133, a circular cylindrical pilot valve member 134 having a bottom in the middle thereof, an annular retaining member 135, and a circular cylindrical solenoid casing 136. These members are disposed to abut against one another and secured by connecting the solenoid casing 136 to the casing 126 with a nut 137.

The passage plate 130 is secured in abutting contact with an inward flange 126A formed on an end portion of the casing 126. The passage plate 130 has a plurality of radially extending passages 138 (cut portions) communicating between the reservoir 104 and a chamber 126B in the casing 126. The passage member 131 has a small-diameter portion and a large-diameter portion. The distal end of the small-diameter portion is inserted through the passage plate 130, and the shoulder of the large-diameter portion is abutted against the passage plate 130. In this way, the passage member 131 is secured. The proximal end portion of the passage member 131 is fluid-tightly fitted to the opening portion 123 of the separator tube 120 with a seal member 139 interposed therebetween. The passage member 131 has a passage 140 axially extending therethrough to communicate with the annular passage 121.

The main valve member 132 is secured with one end portion thereof abutting against the large-diameter portion of the passage member 131. A seal member 143 seals between the mutually abutting portions of the main valve member 132 and the passage member 131. The main valve member 132 is provided with a plurality of circumferentially spaced passages 144 axially extending therethrough. The passages 144 communicate with the passage 140 of the passage member 131. The other end of the main valve member 132 has an annular seat portion 145 projecting from a position at the outer peripheral side of the openings of the passages 144. Further, the other end of the main valve member 132 has an annular clamp portion 146 projecting from a position at the inner peripheral side of the openings of the passages 144.

An outer peripheral portion of a disk valve 147 constituting the main valve 127 seats on the seat portion 145 of the main valve member 132. An inner peripheral portion of the disk valve 147 is secured by being axially clamped between the clamp portion 146 and the shoulder of a large-diameter portion of the orifice passage member 133. An outer peripheral portion of the rear surface of the disk valve 147 is integrally provided with an annular elastic seal member 148. The flanged cylinder-shaped orifice passage member 133 has a small-diameter shaft portion 133A at one end thereof. The small-diameter shaft portion 133A is fitted into an opening in the center of the main valve member 132. The shoulder of the large-diameter portion of the orifice passage member 133 abuts against the disk valve 147, and a small-diameter shaft portion 133B at the other end of the orifice passage member 133 is fitted into a port 152 in the center of the pilot valve member 134. In this way, the orifice passage member 133 is secured. The orifice passage member 133 has a passage 149 axially extending therethrough. The passage 149 communicates with the passage 140 of the passage member 131 through a fixed orifice 150 formed in the distal end of the shaft portion 133A.

The pilot valve member 134 has a cylindrical configuration having a bottom 134A in the middle thereof. The pilot valve member 134 is secured with one end of the bottom 134A abutting against the orifice passage member 133. An outer peripheral portion of the elastic seal member 148 of the disk valve 147 is slidably and fluid-tightly fitted to an inner peripheral surface 134B of a circular cylindrical portion at one end of the pilot valve member 134, thereby forming a pilot chamber 151 at the back of the disk valve 147. The disk valve 147 opens upon receiving the pressure in the passages 144 to allow the passages 144 to communicate with the chamber 126B in the casing 126, which is downstream of the disk valve 147. The pressure in the pilot chamber 151 acts on the disk valve 147 in the direction for closing the disk valve 147. The port 152 extends through the center of the bottom 134A of the pilot valve member 134. The port 152 communicates with the passage 149 of the orifice passage member 133. The pilot chamber 151 communicates with the passage 149 through passages 153 radially extending through the large-diameter portion of the orifice passage member 133. The passages 153, the passage 149 and the fixed orifice 150 constitute an inlet passage introducing the hydraulic oil into the pilot chamber 151.

The retaining member 135 has an annular projection 154 formed on an outer peripheral portion of one end thereof. The retaining member 135 is secured with the annular projection 154 abutting against the end of a circular cylindrical portion of the other end of the pilot valve member 134. Thus, a valve chamber 155 is formed inside the cylindrical portion of the pilot valve member 134. A circular cylindrical portion of the solenoid casing 136, which is fitted in the casing 126, is fitted to the respective outer peripheral portions of the pilot valve member 134 and the retaining member 135, thereby allowing the pilot valve member 134 and the retaining member 135 to be radially positioned. The valve chamber 155 communicates with the chamber 126B in the casing 126 through a passage 156 formed between the retaining member 135 and the solenoid casing 136 and through a passage 157 formed between the pilot valve member 134 and the cylindrical portion of the solenoid casing 136. The port 152, the valve chamber 155 and the passages 156 and 157 constitute a pilot passage communicating between the pilot chamber 151 and the chamber 126B downstream of the disk valve 147 (main valve 127). The valve chamber 155 is provided therein with a valving element 158 of the pilot valve 128. The pilot valve 128 is a pressure control valve selectively opening and closing the port 152.

The solenoid casing 136 contains a coil 159, cores 160 and 161 inserted in the coil 159, a plunger 162 guided by the cores 160 and 161, and a hollow actuating rod 163 connected to the plunger 162. These members constitute a solenoid actuator S. The distal end portion of the actuating rod 163 extends through the retaining member 135 and is connected to the valving element 158 in the valve chamber 155. When the coil 159 is supplied with an electric current through a lead wire 164, axial thrust is generated in the plunger 162 according to the supplied electric current.

The valving element 158 has a tapered distal end portion that faces the port 152 of the pilot valve member 134. An annular seat portion 165 is formed on the tapered distal end portion of the valving element 158. The seat portion 165 selectively unseats from and seats on a seat surface 166 around the port 152, thereby opening and closing the port 152. A valve spring 167 (compression coil spring) serving as an urging member is interposed between the valving element 158 and the bottom 134A of the pilot valve member 134. The valving element 158 is urged by the spring force of the valve spring 167 to normally remain at a retract position to open the port 152. When the coil 159 is supplied with an electric current, thrust is generated in the plunger 162, causing the valving element 158 to advance against the spring force of the valve spring 167. Consequently, the seat portion 165 seats on the seat surface 166 to close the port 152, as shown in FIG. 3. The pressure in the port 152, i.e. the pressure in the pilot chamber 151, is controlled by adjusting the valve-opening pressure of the valving element 158 through the thrust of the plunger 162, i.e. the electric current supplied to the coil 159.

The hollow actuating rod 163 is inserted into the valving element 158. When the valving element 158 is in a valve closing position, i.e. when the seat portion 165 seats on the seat surface 166, a passage 163A in the actuating rod 163 opens into the port 152. The passage 163A communicates between the port 152 and a chamber 161A in the core 161 at the back of the actuating rod 163, thereby reducing the pressure-receiving area of the valving element 158, with which the valving element 158 receives the pressure from the port 152, and thus increasing the variable width of the valve-opening pressure of the valving element 158 with respect to the thrust of the plunger 162.

The fail-safe valve 129 has an annular fail-safe disk 170. The fail-safe disk 170 is supported at an outer peripheral portion thereof between the pilot valve member 134 and the retaining member 135. When the coil 159 is unenergized, the valving element 158 is retracted by the spring force of the valve spring 167 to abut against an inner peripheral portion of the fail-safe disk 170, thereby closing the flow path between the port 152 and the passage 156 in the valve chamber 155. In this state, the port 152 and the passage 156 are communicated with each other through an orifice 170A formed in the inner peripheral edge of the fail-safe disk 170. Accordingly, when the pressure of fluid at the port 152 side in the valve chamber 155 rises to reach a predetermined pressure, the fail-safe disk 170 deflects, and the valving element 158 further retracts until the retract position of the valving element 158 is limited by a stopper 171. Thereafter, the fail-safe disk 170 separates from the valving element 158 to open the flow path between the port 152 and the passage 156.

When the coil 159 is energized, the seat portion 165 of the valving element 158 is caused to seat on the seat surface 166 to execute pressure control by the pilot valve 128. During the pressure control by the pilot valve 128, the valving element 158 is separate from the fail-safe disk 170 to provide communication between the port 152 and the passage 156 in the valve chamber 155 through the opening in the center of the fail-safe disk 170.

Next, the main valve 127 will be explained with reference mainly to FIG. 5.

As in the case of the foregoing first embodiment, the elastic seal member 148 is made of an elastic material, e.g. rubber, and fixed to the rear surface of the disk valve 147 by vulcanization bonding or the like. The outer periphery of the elastic seal member 148 is tapered. The outer periphery of the elastic seal member 148 is formed with a plurality of steps to seal the area of sliding contact with the inner peripheral surface 134B of the cylindrical portion of the pilot valve member 134 in a multi-step sealing manner. The outer diameter of the elastic seal member 148 is larger than the diameter of the inner peripheral surface 134B of the cylindrical portion of the pilot valve member 134. Thus, an interference F is formed between the elastic seal member 148 and the inner peripheral surface 134B. The inner diameter of the disk valve 147 is sufficiently larger than the outer diameter of the shaft portion 133A of the orifice passage member 133. Thus, a clearance C is formed between the disk valve 147 and the shaft portion 133A of the orifice passage member 133 over the entire circumference of the shaft portion 133A. That is, the positioning of the disk valve 147 in the radial direction is performed by fitting between the outer periphery of the elastic seal member 148 and the inner peripheral surface 134B of the cylindrical portion of the pilot valve member 134, which are fitted to each other with the interference F. Any misalignment between the respective centers of the inner periphery of the disk valve 147 and the outer periphery of the shaft portion 133A of the orifice passage member 133 can be accommodated by the clearance C. The disk valve 147 is positioned in the radial direction in this way, and in this state, the inner peripheral portion of the disk valve 147 is axially clamped and secured by tightening the nut 137.

The minimum value D'min of the inner diameter of the disk valve 147 may be obtained by the following equation as in the case of the foregoing first embodiment:

$$D'\text{min}=d'\text{max}+(Z1'+Z2')$$

where:

d'max: the maximum diameter of the shaft portion 133A of the orifice passage member 133;

Z1': the coaxiality between the inner periphery of the disk valve 147 and the outer periphery of the elastic seal member 148;

Z2': the coaxiality between the inner peripheral surface 134B of the cylindrical portion of the pilot valve member 134 and the shaft portion 133A of the orifice passage member 133.

The following is an explanation of the operation of this embodiment arranged as stated above.

The damping force control type shock absorber 101 is installed between sprung and unsprung members of a suspension system of a vehicle. The lead wire 164 is connected to an in-vehicle controller or the like. In a normal operating state, the coil 159 is energized to seat the seat portion 165 of the valving element 158 on the seat surface 166 to execute pressure control by the pilot valve 128.

During the extension stroke of the piston rod 106, the movement of the piston 105 in the cylinder 102 closes the check valve 113 of the piston 105. Before the disk valve 114 opens, the fluid in the cylinder upper chamber 102A is pressurized, and the pressurized fluid passes through the passage 122 and the annular passage 121 and flows into the passage 140 of the passage member 131 of the damping force generating mechanism 125 from the opening portion 123 of the separator tube 120.

At this time, an amount of fluid corresponding to the amount of movement of the piston 105 flows into the cylinder lower chamber 102B from the reservoir 104 by opening the check valve 117 of the base valve 110. It should be noted that when the pressure in the cylinder upper chamber 102A reaches the valve-opening pressure of the disk valve 114 of the piston 105, the disk valve 114 opens to relieve the pressure in the cylinder upper chamber 102A into the cylinder lower chamber 102B, thereby preventing an excessive increase in pressure in the cylinder upper chamber 102A.

In the damping force generating mechanism 125, the fluid from the passage 140 of the passage member 131 flows as follows. Before the disk valve 147 of the main valve 127 opens (in the low piston speed region), the fluid passes through the fixed orifice 150 and the passage 149 of the orifice passage member 133 and the port 152 of the pilot valve member 134 and pushes open the valving element 158 of the pilot valve 128 to flow into the valve chamber 155. The fluid flowing into the valve chamber 155 further passes through the opening of the fail-safe disk 170 and flows into the reservoir 104 through the passages 156 and 157 and through the chamber 126B in the casing 126 and further through the passages 138 of the passage plate 130. When the piston speed increases and the pressure in the cylinder upper chamber 102A reaches the valve-opening pressure of the disk valve 147, the fluid flowing into the passage 140 passes through the passages 144 and pushes open the disk valve 147 to flow directly into the chamber 126B in the casing 126.

During the compression stroke of the piston rod 106, the movement of the piston 105 in the cylinder 102 opens the check valve 113 of the piston 105 and closes the check valve 117 for the passage 115 of the base valve 110. Before the disk valve 118 opens, the fluid in the cylinder lower chamber 102B flows into the cylinder upper chamber 102A, and an amount of fluid corresponding to the amount by which the piston rod 106 enters the cylinder 102 flows from the cylinder upper chamber 102A into the reservoir 104 through a flow path similar to that during the above-described extension stroke. It should be noted that when the pressure in the cylinder lower chamber 102B reaches the valve-opening pressure of the disk valve 118 of the base valve 110, the disk valve 118 opens to relieve the pressure in the cylinder lower chamber 102B into the reservoir 104, thereby preventing an excessive increase in pressure in the cylinder lower chamber 102B.

Thus, during both the extension and compression strokes of the piston rod 106, before the disk valve 147 of the main valve 127 opens (in the low piston speed region) in the damping force generating mechanism 125, a damping force is generated by the fixed orifice 150 and the valve-opening pressure of the valving element 158 of the pilot valve 128. After the disk valve 147 has opened (in the high piston speed region), a damping force is generated according to the degree of opening of the valving element 158. The damping force can be controlled directly, independently of the piston speed, by controlling the valve-opening pressure of the pilot valve 128 through the electric current supplied to the coil 159. In this regard, variation in the valve-opening pressure of the pilot valve 128 causes a change in the pressure in the back pressure chamber 155, which communicates with the passage 149 at the upstream side of the pilot valve 128. Because the pressure in the back pressure chamber 155 acts in the direction for closing the disk valve 147, the valve-opening pressure of the disk valve 147 can be controlled simultaneously by controlling the valve-opening pressure of the pilot valve 128, and hence the damping force characteristic control range can be widened.

In addition, when the electric current supplied to the coil 159 is reduced to reduce the thrust of the plunger 162, the valve-opening pressure of the pilot valve 128 lowers, and soft damping force is generated. On the other hand, when the electric current supplied to the coil 159 is increased to increase the thrust of the plunger 162, the valve-opening pressure of the pilot valve 128 rises, and hard damping force is generated. Thus, soft damping force, which is generally used frequently, can be generated with a reduced electric current, and the power consumption can be reduced.

In the event that the thrust of the plunger 162 is lost owing to a failure such as disconnection of the coil 159, a trouble in the in-vehicle controller, etc., the valving element 158 is retracted by the spring force of the valve spring 167 to open the port 152. Further, the valving element 158 abuts against the fail-safe disk 170 to close the flow path between the port 152 and the passage 156 in the valve chamber 155. In this state, the flow of fluid from the port 152 to the passage 156 in the valve chamber 155 is controlled by the fail-safe valve 129 (i.e. the orifice 170A and the fail-safe disk 170). Therefore, it is possible to generate a desired damping force and to control the pressure in the pilot chamber 151, i.e. the valve-opening pressure of the fail-safe disk 170, according to setting of the flow path area of the orifice 170A and the valve-opening pressure of the fail-safe disk 170. Consequently, an appropriate damping force can be obtained even in the event of a failure.

In the main valve 127, the outer diameter of the elastic seal member 148 is larger than the diameter of the inner peripheral surface 134B of the cylindrical portion of the pilot valve member 134 to form an interference F between the elastic seal member 148 and the cylindrical portion of the valve member 134. In addition, the inner diameter of the disk valve 147 is sufficiently larger than the outer diameter of the shaft portion 133A of the orifice passage member 133 to form a clearance C between the disk valve 147 and the shaft portion 133A. Therefore, the disk valve 147 is self-aligned by fitting between the outer periphery of the elastic seal member 148 and the inner periphery surface 134B of the cylindrical portion of the pilot valve member 134. In this position, the disk valve 147 is axially clamped and secured by tightening the nut 137. Accordingly, any misalignment between the respective centers of the outer periphery of the elastic seal member 148, the inner periphery of the disk valve 147, the inner periphery of the port 152 of the pilot valve member 134 and the orifice passage member 133 can be allowed by the clearance C, and it is therefore possible to ensure slidability and sealability between the elastic seal member 148 of the disk valve 147 and the inner peripheral surface 134B of the cylindrical portion of the pilot valve member 134 and hence possible to obtain stable damping force characteristics. In addition, because the requirements for dimensional tolerances and coaxiality are reduced, it is possible to increase productivity and to reduce manufacturing cost.

Accordingly, when the disk valve 147 is assembled to the shaft portion 133A, the inner peripheral surface 134B of the cylindrical portion at one end of the pilot valve member 134 serving as a casing member and the elastic seal member 148 form concentric circles, respectively. Further, in this embodiment, the elastic seal member 148 is fixed to the main valve 127 by vulcanization bonding. In this regard, it is difficult to perform processing for obtaining coaxiality of the elastic seal member 148 with respect to the main valve 127. However, any coaxiality error can be allowed by the clearance C. Therefore, it is possible to reduce the processing time for vulcanization bonding.

In the second embodiment also, the clearance C is formed between the inner periphery of the main valve 127 and the outer periphery of the shaft portion 133A over the entire circumference of the shaft portion 133A, as in the case of the first embodiment. In actual practice, however, there may be a case (individual) where an area with no clearance (i.e. an area with a clearance of zero) occurs locally in the circumferential direction due to the main valve 127 being slightly displaced in the radial direction in the course of tightening the nut 137 or due to dimensional tolerances, etc. However, the slidability and sealability of the elastic seal member 148 can be improved as compared to the conventional technique, provided that the clearance C is formed over substantially the entire circumference of the shaft portion 133A according to the design concept.

Further, in this embodiment, the clearance C formed between the inner periphery of the disk valve 147 and the outer periphery of the shaft portion 133A of the orifice passage member 133 is larger than the clearance between the outer periphery of the shaft portion 133A and the inner periphery of a washer 180', which comprises retainers 171 and 170 and a disk member 173 stacked on the disk valve 147, when these constituent members are assembled together by the nut 137 serving as a securing member. With this structure, the washer 180' is positioned by being restricted at the inner periphery thereof by the inner periphery of the washer 180' and the outer periphery of the shaft portion 133A. On the other hand, the disk valve 147 is positioned by being restricted at the outer periphery thereof by the outer periphery of the elastic seal member 148 and the inner peripheral surface 134B of the cylindrical portion of the pilot valve member 134.

In the foregoing second embodiment, in place of or in addition to the clearance C provided between the inner periphery of the disk valve 147 and the shaft portion 133A of the orifice passage member 133, a clearance may be formed between the inner periphery of the port 152 in the bottom of the pilot valve member 134 and the outer periphery of the shaft portion 133B of the orifice passage member 133, which is fitted into the port 152, over the entire circumference of the shaft portion 133B to allow the above-described center misalignment. Although in the second embodiment the pilot valve member 134 and the orifice passage member 133 are discrete from each other, these members may be integrated into one unit.

Although the foregoing first and second embodiments use a hydraulic oil and a gas as hydraulic fluids from the viewpoint of operation stability and convenience for handling, the present invention is not limited thereto but can use other fluids alone or in combination. Although in the second embodiment the pilot valve 128 is a pressure control valve, by way of example, it may be a flow control valve, which controls the flow rate of fluid.

It should be noted that conventional hydraulic shock absorbers also have a microscopic gap between a shaft portion of a piston rod and a piston, a disk, etc. fitted onto the shaft portion. In this regard, however, the clearance C in the foregoing embodiments is sufficiently larger than the gap between the shaft portion of the piston rod and the piston or other member fitted onto the shaft portion radially immovably, and the clearance C is such a size that the disk valve can be disposed with the clearance C over the entire circumference of the shaft portion according to the design concept. (From the viewpoint of the design concept, the piston or other radially immovable member is difficult to dispose with the clearance C over the entire circumference of the shaft portion.)

The shock absorbers according to the foregoing embodiments are capable of increasing the slidability and sealability of the elastic seal member provided on the rear surface of the disk valve to form a back pressure chamber while reducing the coaxiality requirements for each part of the damping force generating mechanism.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-194903 filed on Aug. 31, 2010.

The entire disclosure of Japanese Patent Application No. 2010-194903 filed on Aug. 31, 2010 including specification, claims, drawings and summary is incorporated herein by reference in its entirety.

What is claimed is:

1. A shock absorber comprising:
a cylinder having a hydraulic fluid sealed therein;
a piston slidably fitted in the cylinder;
a piston rod which is connected to the piston and which extends to an outside of the cylinder; and
a damping force generating mechanism adapted to generate a damping force by controlling a flow of the hydraulic fluid induced by sliding movement of the piston;
the damping force generating mechanism comprising:
an annular disk valve;
an annular elastic seal member integrally provided on a rear surface of the disk valve;
a cylindrical casing member having a bottom and having an inner peripheral surface to which the elastic seal member is slidably fitted to form a back pressure chamber at a rear side of the disk valve; and
a shaft portion having a circular outer periphery, the shaft portion being disposed in a mutual center of the disk valve and the bottom of the casing member;
the disk valve being secured to the casing member by being axially clamped at an inner peripheral portion thereof such that an inner peripheral portion of the disk valve is prevented from moving when the disk valve is opened;
wherein a clearance is formed between the inner peripheral portion of the disk valve and the outer periphery of the shaft portion over substantially an entire circumference of the shaft portion, and the clearance is configured to allow misalignment between the centers of the disk valve and the shaft portion when the inner peripheral portion of the disk valve is clamped.

2. The shock absorber of claim 1, wherein the shaft portion is discrete from the casing member, the shaft portion being inserted into the bottom of the casing member.

3. The shock absorber of claim 2, wherein, when the disk valve is assembled to the shaft portion, the inner peripheral surface of the casing member and the elastic seal member form concentric circles, respectively.

4. The shock absorber of claim 1, wherein the shaft portion is integrally formed with the casing member.

5. The shock absorber of claim 4, wherein, when the disk valve is assembled to the shaft portion, the inner peripheral surface of the casing member and the elastic seal member form concentric circles, respectively.

6. The shock absorber of claim 1, wherein, when the disk valve is assembled to the shaft portion, the inner peripheral surface of the casing member and the elastic seal member form concentric circles, respectively.

7. The shock absorber of claim 1, wherein the damping force generating mechanism comprises:
a washer provided over at least one surface of the disk valve; and
a securing member securing the washer and the disk valve to the shaft portion;
wherein an inner diameter of the disk valve is larger than an inner diameter of the washer.

8. A shock absorber comprising:
a cylinder having a hydraulic fluid sealed therein;
a piston slidably fitted in the cylinder;
a piston rod which is connected to the piston and which extends to an outside of the cylinder; and
a damping force generating mechanism adapted to generate a damping force by controlling a flow of the hydraulic fluid induced by sliding movement of the piston;
the damping force generating mechanism comprising:
an annular disk valve;
an annular elastic seal member integrally provided on a rear surface of the disk valve;
a cylindrical casing member having a bottom and having an inner peripheral surface to which the elastic seal member is slidably fitted to form a back pressure chamber at a rear side of the disk valve; and
a shaft portion having a circular outer periphery, the shaft portion being disposed in a mutual center of the disk valve and the bottom of the casing member;
an inner peripheral portion of the disk valve and the casing member being secured by being axially clamped such that an inner peripheral portion of the disk valve is prevented from moving when the disk valve is opened;
wherein a clearance is formed between the outer periphery of the shaft portion and at least one of the inner peripheral portion of the disk valve and an inner peripheral portion of the bottom of the casing member over substantially an entire circumference of the shaft portion, and the clearance is configured to allow misalignment between center of the shaft portion and the center of said one of the disk valve and the casing member when the inner peripheral portion of the disk valve and the casing member is clamped.

9. The shock absorber of claim 8, wherein, when the disk valve is assembled to the shaft portion, the inner peripheral surface of the casing member and the elastic seal member form concentric circles, respectively.

10. The shock absorber of claim 8, wherein the shaft portion is discrete from the casing member, the shaft portion being inserted into the bottom of the casing member.

11. The shock absorber of claim 8, wherein the shaft portion is integrally formed with the casing member.

* * * * *